United States Patent [19]

Forsythe

[11] Patent Number: 5,079,064
[45] Date of Patent: Jan. 7, 1992

[54] THERMAL SHOCK RESISTANT CERAMIC HONEYCOMB STRUCTURES OF CORDIERITE, MULLITE AND CORUNDUM

[75] Inventor: George D. Forsythe, Landenberg, Pa.

[73] Assignee: E. I. Du Pont de Nemours and Company, Wilmington, Del.

[21] Appl. No.: 516,705

[22] Filed: Apr. 30, 1990

[51] Int. Cl.$^5$ .................. B32B 3/12; B32B 5/12; C04B 35/18; C04B 35/20

[52] U.S. Cl. .................. 428/131; 428/116; 428/135; 428/137; 428/134; 428/107; 428/113; 428/114; 428/325; 428/373; 428/374; 428/384; 428/389; 428/432; 428/268; 428/294; 428/697; 428/701; 501/118; 501/119; 501/122

[58] Field of Search .............. 428/131, 116, 135, 137, 428/134, 107, 113, 114, 325, 373, 374, 384, 389, 432, 268, 294, 697, 701; 501/118, 119, 122

[56] References Cited

U.S. PATENT DOCUMENTS

| | | | |
|---|---|---|---|
| 3,244,540 | 4/1966 | Hailstone et al. | 501/125 |
| 3,255,027 | 6/1966 | Talsma | 501/128 |
| 3,298,842 | 1/1967 | Seufert | 501/80 |
| 3,311,488 | 3/1967 | Seufert et al. | 427/215 |
| 3,949,109 | 4/1976 | MaBride | 428/135 |
| 3,986,528 | 10/1976 | Green | 138/177 |
| 4,069,157 | 1/1978 | Hoover et al. | 210/433 |
| 4,092,194 | 5/1978 | Green | 156/89 |
| 4,258,099 | 3/1981 | Naromiza | 501/118 X |
| 4,280,845 | 7/1981 | Matsuhisa et al. | 428/116 X |
| 4,435,512 | 3/1984 | Ito et al. | 501/118 X |
| 4,568,402 | 2/1986 | Ogawa et al. | 501/119 X |
| 4,741,792 | 5/1987 | Matsuhisa et al. | 156/89 |
| 4,810,681 | 3/1989 | Hayakawa | 501/118 X |
| 4,812,276 | 3/1989 | Chao | 264/177.11 |
| 4,869,944 | 9/1989 | Harada et al. | 428/116 |

Primary Examiner—James J. Seidleck
Assistant Examiner—William P. Watkins

[57] ABSTRACT

A ceramic honeycomb structure containing $SiO_2$, $Al_2O_3$ and MgO primarily in the form of cordierite, mullite and corundum having a compositional gradient in the direction of the channels of the honeycomb and having extensive microcracking provides high resistance to thermal shock, and is useful as a substrate for catalysts.

4 Claims, 1 Drawing Sheet

THERMAL SHOCK RESISTANT CERAMIC HONEYCOMB STRUCTURES OF CORDIERITE, MULLITE AND CORUNDUM

BACKGROUND OF THE INVENTION

This invention relates to ceramic structures which have high resistance to thermal shock.

Many electric utility companies maintain standby gas-fired generators which are reserved for use in times of peak demand or emergency shutdown of other generating facilities. Such generators employ large compressors to force air through combustion zones where natural gas is burned. The resulting heated combustion product is used to drive turbines for the generation of electricity.

The temperature of a natural gas flame at its hottest point is sufficient to form some nitrogen oxides which are objectionable from an environmental point of view. Treatment of the entire exhaust gas stream to remove nitrogen oxides would be prohibitively expensive. One alternative would be to accomplish combustion of the natural gas with the use of a catalyst, which could decrease the combustion temperature to a level at which nitrogen oxides are not created. However, the support structure for the catalyst must be able to withstand the temperature of catalyzed gas combustion, about 1260° C., and must also be able to withstand repeated cycles of thermal shock created when the generator is started up and is shut down. When such a generator is shut down, the gas supply is cut off, but compressed air continues to flow through the combustion chamber, cooling the catalyst support very rapidly. A catalyst support structure in such a situation might be subjected to a typical temperature change of from 1260° to 300° C. in only 0.02 to 0.1 seconds.

In addition to the requirement of withstanding severe thermal shock, the catalyst support structures must not fail in a manner that would damage the downstream turbine blades. Thus the desirable ceramic structure must not only be able to withstand the very severe temperature fluctuations without breaking, but if it does break, it must fracture into small highly frangible and therefore harmless particles.

The use of ceramic honeycomb structures as catalyst supports is well known in the art. U.S. Pat. No. 4,092,194 and U.S. Pat. No. 3,986,528 describe tubes of multiple layers of ceramic fibers bonded to one another at the points where the fibers cross. The materials used to make these tubes can include alumina or alumina precursors and S glass, so reaction products of these materials may also be present. These structures have channels which are not discrete, but which interconnect between the crossing points of the yarn. See also U.S. Pat. No. 3,949,109 which discloses similar structures of partly sintered glass-ceramic fibers.

Other references disclose extruded ceramic honeycomb shapes. See for example U.S. Pat. No. 4,869,944 which describes a ceramic structure consisting of $SiO_2$, $Al_2O_3$ and MgO, primarily in the form of cordierite. The structure has microcracks which is said to help absorb thermal expansion and thus contribute to resistance to thermal shock. Other extruded or molded structures are taught in U.S. Pat. No. 4,069,157. This patent lists alumina, mullite and cordierite as being useful alternative materials for the manufacture of the structures, but states that the structures can be used at the relatively low temperature of 300° C. (Col. 2, line 3).

U.S. Pat. No. 3,255,027 teaches refractory structures which may include honeycombs (col. 4, line 61) made from alumina, and which may include other components such as silica and mullite. Other commonly assigned patents with disclosures of alumina refractories possibly including components such as silica and mullite are U.S. Pat. Nos. 3,311,488, 3,298,842 and 3,244,540.

None of the references teach ceramic structures capable of surviving the severe conditions described above. Further, the monolithic molded or extruded structures of these references could pose risk of damage to turbine blades in the event they failed, fracturing into large pieces.

SUMMARY OF THE INVENTION

This invention provides rigid ceramic structures capable of withstanding the severe conditions described above. The structures have substantially discrete channels passing all the way through the structure. The chemical composition of the structures is about 20-40% $SiO_2$, about 3-6% MgO and about 54-77% $Al_2O_3$, all of the percentages being by weight. These oxides are present as 50-90% crystalline material, the balance being amorphous. Although the structures are manufactured using glass fibers, substantially no glass fiber remains in the finished structure. The crystalline content is about 15-40% cordierite, 15-35% corundum and 10-30% mullite. These are percentages by weight based on the total weight of the structure including the non-crystalline component. The structure exhibits microcracking throughout.

In a preferred embodiment, the structure is composed of 25-30% $SiO_2$, 4 to 5% MgO and 60 to 70% $Al_2O_3$, about 75 to 80 percent of the material being present in crystalline form, 25-30% being cordierite, 25-30% being corundum and 20 to 30% being mullite. Preferred structures are substantially planar in form. In one embodiment, the structures are about 2 inches thick and several feet wide. The channels pass completely through the smallest dimension of the structure.

These structures are prepared by first making a preform of glass fiber. Glass fiber known as S glass is preferred because it does not contain boron compounds which interfere with high temperature performance. The preform is made by laying up layers of glass fibers, the fibers in each layer being parallel to one another, intersecting fibers in adjacent layers, and parallel to fibers in alternate layers. The fibers in alternate layers are aligned with one another so as to define channels through the preform. In a preferred embodiment, the channels are rectangular, and more preferably are square. The preform is wetted with a dispersion of alumina in a solution of alumina precursor, and heated so that the spaces defined by parallel fibers in alternate layers and intersecting fibers in adjacent layers are filled with alumina. At heating temperatures sufficiently high, preferably at least 1380° C., the glass melts and the silica and magnesia in the glass in combination with the alumina in the coating material form cordierite and mullite. Substantially no continuous glass fiber remains, but the walls of the channels through the resulting structure remain intact so there is substantially no interconnection between the channels.

Because the crystalline material of the channel walls is the result of the interaction of glass and alumina, each segment of the final structure corresponding to a layer of glass fibers in the preform exhibits a compositional gradient in the direction of the channels, with SiO$_2$ concentrations being higher in regions nearest the original location of the glass fibers, and decreasing as the distance from the location of the glass fiber increases. The Al$_2$O$_3$ concentrations will be lower where the SiO$_2$ concentrations are higher, and higher where the SiO$_2$ concentrations are lower.

The invention also includes the ceramic structures described above, coated with a catalyst.

DETAILED DESCRIPTION OF THE INVENTION

Figure 1:
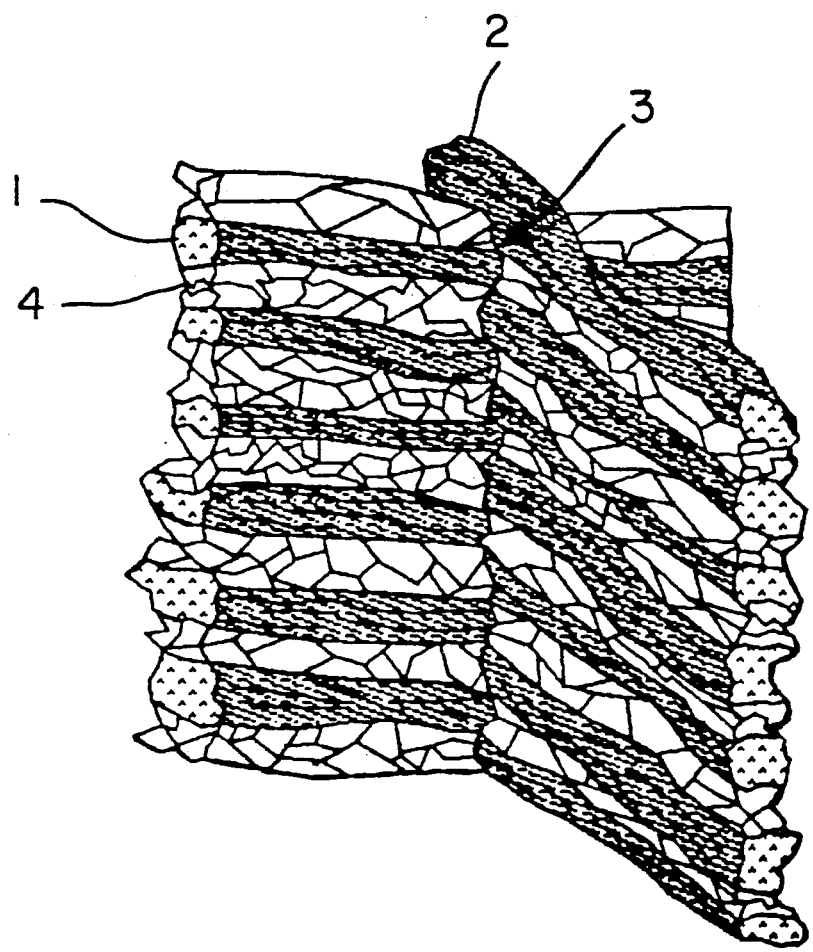
FIG. 1 shows a small segment of the structure of this invention.

The glass fibers useful in this invention are substantially free of boron compounds. They are commercially available from Owens-Corning under the name S-glass or S-2 glass fibers. The fiber size and arrangement in the preform are selected so as to define the desired number per unit area of channels in the final product. The description above concerning plying layers of parallel fibers which intersect with fibers in adjacent layers is meant to include as an alternate method, the use of mats or woven screens of glass fibers in which each fiber alternately passes over and under successive intersecting fibers. Such screens can be layed up and aligned to make the fiber preform in place of arranging individual fibers. Such screens or mats or individual fibers may also be wetted with the alumina mixture prior to combining the screens or mats to make a preform. The language used to describe the process of making the claimed structures is meant to include either wetting the preform after it is made, or wetting the components used to make the preform.

If the preform is to be made by layering arrays of fibers, machines, for example as described in U.S. Pat. No. 4,867,825, may be used to lay down layers of fibers.

Alumina useful in the process of this invention is commercially available as grade A-16 alpha alumina powder from Alcoa. Alumina precursors are soluble basic aluminum salts. A suitable alumina precursor solution is sold by Reheis Chemical Company. It is known as "Chlorhydrol" aluminum chlorohydrate solution. A mixture of alumina and water is prepared and the pH is adjusted with hydrochloric acid so that it is less than 1. Chlorhydrol is added to the mixture as is a small amount of MgCl and the mixture is stirred and heated to permit polymerization of the Chlorhydrol. The stirring time and temperature are not critical. Stirring at a temperature about 60° C. overnight should be sufficient.

To coat the preform with the alumina mixture, the preform is simply immersed in the mixture. The preform may be left in the mixture for a period of time, for example 45 minutes, to assure complete wetting. The preform is then removed from the alumina mixture and allowed to drain. Alternatively, it may be satisfactory to spray the alumina mixture onto the preform. It may be necessary to turn or tilt the wetted preform from time to time as it is draining to assure even coating of the fibers. The coating process should be carried out so that the spaces between parallel fibers in alternate layers are filled, but the spaces between fibers in the same layer are not filled, thus defining discrete non-interconnecting channels in the structure. It is acceptable for there to be some areas where there is some interconnection between the channels, but in general these interconnections are to be minimized because they represent defects which can lead to fracture of the structure in use. The term "substantially discrete channels" is meant to describe structures in which the interconnections between channels are small enough or few enough in number that the operability of the structure is not impaired. By the process of this invention it is possible to produce a structure in which less than 1% of the spaces between fibers in alternate layers remain unfilled with ceramic material.

The coated preform is then dried. Drying at room temperature for about 10 hours is generally sufficient. It may be necessary to repeat the coating and drying step several times to obtain a satisfactory coating on the glass fibers. The dried coated preform is then heated. In a typical heating cycle the oven temperature is increased at a rate to 10° C. per minute until the maximum temperature is reached. A preferred maximum temperature is about 1380° C. The maximum temperature is maintained for 1 to 2 hours, after which the oven temperature is decreased at a rate of about 10° C. per minute until the temperature is 800° C. or less. The maximum temperature and time must be sufficient to permit interaction of SiO$_2$, MgO and Al$_2$O$_3$ to form mullite and cordierite. As used herein, the term cordierite in intended to include indialite, a crystalline material having the same chemical composition as cordierite, but a slightly different morphology.

As the interaction occurs, SiO$_2$ and MgO originally present in the glass fiber used to make the preform migrate away from the glass fiber location, but their concentration will be higher nearer their original position and lower as the distance from their original position increases. Thus, the final structure will not be uniform in composition throughout, but will have layers corresponding to the layers of glass in the preform.

In some locations it is possible that the SiO$_2$ will have completely flowed or migrated from its original location, and a hole will exist inside the channel wall corresponding to the original location of the fiber. This is not a defect in the structure, since the hole will be surrounded by ceramic material, and there will be no interconnection between adjacent channels.

The formation of crystals of mullite, cordierite and corundum, each having different coefficients of thermal expansion, leads to the formation of microcracking in the structure. These microcracks form along crystalline boundaries, and within regions having only a single phase. These microcracks absorb stresses created by thermal shock. Further, the layered nature of the structure, with the layers being generally perpendicular to the channels, tends to deter formation or propagation of cracks which are parallel to the channels. Cracking running perpendicular to the channels is less likely to lead to structural failure than cracking along the channels.

Since the structures of this invention are extensively microcracked, they are relatively weak and very frangible. In the event of fracture, the structures readily disintegrate into very small powdery particles which pose no threat of damage to equipment such as turbines used in conjunction with the structures.

FIG. 1 shows a small segment of material broken from a larger structure of this invention. Ceramic material resulting from the interaction of glass and alumina, 1 and 2, indicate the original position of the glass fibers in the preform. Such fibers were in adjacent layers and intersected one another at 3. This ceramic material, 1 and 2, exhibits microcracks primarily along the original fiber axis. The ceramic material, 4, filling the space between the location of parallel glass fibers in alternate layers of the preform exhibits microcracking in rather large blocky sections. Not susceptible of illustration in the drawing is the compositional gradient in each layer discussed above. In fact, there is not a sharp line of demarcation between the material derived from the glass and the material derived from the alumina. The final composition is a result of the melting and diffusion of glass components through and interaction with the alumina.

The description of the method of making the structures of this invention as set out above has identified glass fiber as the $SiO_2$ source, and an alumina-alumina precursor mixture as the alumina source. However, structures of this invention can also be made by substituting alumina fibers such as those described in U.S. Pat. No. 3,808,015 for the glass fibers in the above described process, and substituting for the alumina-alumina precursor mixture a silica source such as a commercially available silica sol, or a silica precursor such as a silicic acid solution, or a mixture of both. The silica source should contain a small amount of magnesia.

The structures of this invention are readily coated with catalysts, or with particles containing catalysts by techniques known in the art. See for example U.S. Pat. No. 4,624,940 and U.S. Pat. No. 4,609,563 for a discussion of catalysts and the methods of applying them to ceramic substrates.

EXAMPLE 1

A glass fiber preform was made as follows. Fibers of continuous filament glass fiber (S-2 CG 75 1/0 1.0 z 636 designation available from Owens/Corning Fiberglas Corp.) were arranged on a pin frame in layers of 48 parallel fibers spaced 0.125 inches center to center alternating with layers of 46 parallel fibers with the same spacing so that fibers in adjacent layers crossed one another at right angles. The completed preform had 450 layers of fibers and was 4.25 inches in depth.

The preform and its support frame were placed in a container of ceramic slurry of depth sufficient to cover the fibers. The slurry was prepared by charging 64.7 pounds of deionized water and 40.8 grams of HCl to a mixing vessel. To this mixture 75 pounds of A-16 alumina powder from Alcoa were added while the mixtrue is agitated. The pH was adjusted to about 0.25 with additional HCl, and Chlorhydrol aluminum chlorohydrate solution (Reheis Chemical Company) was added. The temperature of the mixture was increased to 63° C., about 719 grams of MgCl were added and the mixture was agitated overnight. The mixture was then stored in gallon containers until needed. Prior to use the viscosity of the slurry was adjusted to 250 centipoise with distilled water. The preform was immersed in the slurry for 45 minutes. The preform was removed and allowed to drain in a horizontal position for 15 minutes, and then for an additional 60 minutes tilted on edge. During the latter period, the preform was rotated through 180 degrees after 30 minutes and through another 180 degree turn at the end of the period. the preform was air dried overnight. The preform was removed from the frame and trimmed to 6×5.5×3.75 inches, the depth having decreased during the drying process. The preform was heated in a vented oven at 700° C. for one hour, cooled to room temperature and the dipping, draining, drying and firing cycle was repeated.

After the second low temperature firing, the preform was heated in a non-vented high temperature furnace. The temperature was increased to 800° C. in about 40 minutes, held for about 10 minutes, increased to 1380° C. at a rate of 10° C./minute, held at 1380 degrees for 2 hours, cooled to 800° C. at a rate of 5° C./min., followed by unrestrained cooling to 200° C., after which the preform was removed from the furnace and allowed to come to room temperature.

The structure had a final bulk density of 0.535 g/cc, and a pattern of 65.5 discrete channels per square Average molecular analysis was 26.3% $SiO_2$, 68.95% $Al_2O_3$, and 4.4% MgO. Analysis results for crystalline components were 27.5% cordierite (indialite), 28% corundum and 21.5% mullite. All percentages are by weight.

I claim:

1. A rigid ceramic structure having multiple substantially discrete channels through the structure, said structure consisting essentially of about 20–40% by weight $SiO_2$, about 3–6% by weight MgO and about 54–77% by weight $Al_2O_3$, said oxides being present as from about 50 to about 90% of total weight crystalline material and the balance amorphous material, but substantially no continuous amorphous fibers, the crystalline material being about 15–40% of total weight cordierite, about 15–35% of total weight corundum and about 10–30% of total weight mullite, the structure exhibiting microcracking throughout wherein said structure is able to withstand repeated cycles of thermal shock said cycles having a temperature change of 1260° C. to 300° C. in less than 0.1 second.

2. The structure of claim 1 consisting essentially of 25 to 30% $SiO_2$, 4 to 5% MgO and 60 to 70% $Al_2O_3$, said oxides being present as 75 to 80% crystalline material, the crystalline material being 25 to 30% cordierite, 25 to 30% corundum and 20 to 30% mullite.

3. The structure of claims 1 or 2 in substantially planar form.

4. A structure of claim 1, 2 or 3 comprised of multiple layers normal to the channels, said layers having a compositional gradient in the direction of the channels.

* * * * *